United States Patent
Miyashita et al.

(10) Patent No.: US 6,511,602 B1
(45) Date of Patent: Jan. 28, 2003

(54) APPARATUS AND METHOD FOR TREATING WATER

(75) Inventors: Satoshi Miyashita, Nagoya (JP); Kenji Honjyo, Nagoya (JP); Osami Katou, Nagoya (JP); Hiroyuki Okazaki, Nagoya (JP); Katsuyuki Yanone, Nagoya (JP); Masumi Kobayashi, Tokyo (JP)

(73) Assignee: Mitsubishi Rayon Co., Ltd., Tokyo (JP)

( * ) Notice: Subject to any disclaimer, the term of this patent is extended or adjusted under 35 U.S.C. 154(b) by 0 days.

(21) Appl. No.: 09/555,498

(22) PCT Filed: Dec. 7, 1998

(86) PCT No.: PCT/JP98/05520

§ 371 (c)(1),
(2), (4) Date: Aug. 8, 2000

(87) PCT Pub. No.: WO99/29630

PCT Pub. Date: Jun. 17, 1999

(30) Foreign Application Priority Data

Dec. 5, 1997 (JP) .............................................. 9-335814

(51) Int. Cl.$^7$ .............................................. B01D 65/02
(52) U.S. Cl. .................. 210/636; 210/650; 210/321.69; 261/124
(58) Field of Search ................................ 261/124, 126, 261/DIG. 70; 210/321.69, 636, 321.79, 321.89, 321.78, 650, 220, 221.2; 366/101, 107

(56) References Cited

U.S. PATENT DOCUMENTS

| | | | | |
|---|---|---|---|---|
| 5,248,424 A | * | 9/1993 | Cote et al. | |
| 5,639,373 A | * | 6/1997 | Mahendran et al. | |
| 5,783,083 A | * | 7/1998 | Henshaw et al. | |
| 5,944,997 A | * | 8/1999 | Pedersen et al. | |

FOREIGN PATENT DOCUMENTS

| | | |
|---|---|---|
| JP | 7-24264 | 1/1995 |
| JP | 7-275668 | 10/1995 |
| JP | 9-75937 | 3/1997 |
| JP | 09-117647 | 5/1997 |
| JP | 09-192662 | 7/1997 |
| JP | 10-99856 | 4/1998 |

* cited by examiner

*Primary Examiner*—John Kim
*Assistant Examiner*—David Sorkin
(74) *Attorney, Agent, or Firm*—Fitch, Even, Tabin & Flannery

(57) ABSTRACT

There is here disclosed a water treatment apparatus in which a membrane separation device is disposed above a gas diffuser device arranged in a treating tank, wherein diameters of gas discharge holes formed in the gas diffuser device are within a range of 1 to 10 mm, and a relational expression of 20<X/Y<300 is satisfied wherein X is a sectional area (cm$^2$) of the membrane separation device in a horizontal direction, and Y is the number of the gas discharge holes of the gas diffuser device. According to this water treatment apparatus, the clogging of the pores in the surface of a separation membrane with a suspended substance can be inhibited, so that a stable filtration is possible for a long period of time.

11 Claims, 4 Drawing Sheets

APPARATUS AND METHOD FOR TREATING WATER

This application is the national phase of international application PCT/JP98/05520 filed Dec. 7, 1998 which designated the U.S.

TECHNICAL FIELD

The present invention relates to an apparatus for performing solid-liquid separation by water treatment.

BACKGROUND ART

Heretofore, as a method for performing the solid-liquid separation of water to be treated having a high turbidity such as a water purification treatment, a sewage disposal treatment, a waste water treatment or an industrial waste water treatment, there have been carried out sand filtration, gravity precipitation and the like. In the solid-liquid separation by any of these methods, however, there are inconveniences that the water quality of the treated liquid is insufficient on occasion and that a vast site is required for the solid-liquid separation.

As techniques for eliminating such inconveniences, various methods have nowadays been investigated in which the solid-liquid separation of the water to be treated is carried out by the use of a membrane module provided with a separation membrane such as a precise filter membrane or an ultrafilter membrane. The filtration treatment of the water to be treated by the use of the separation membrane permits obtaining the treated liquid having a high water quality.

In the case that the solid-liquid separation of the water to be treated is done by the use of the separation membrane, the clogging of the pores in the surface of the separation membrane progresses with the continuation of the filtration treatment by suspended substances, so that a filtration flow rate deteriorates or a pressure difference between the membranes increases. In order to eliminate such conditions, a gas diffuser pipe is disposed under the membrane module, whereby air is diffused through the gas diffuser pipe to swing the separation membrane and to thereby separate the suspended substance from the membrane surface.

However, even in the system in which waste water is filtered through the membrane module, it is difficult to uniformly continuously apply air bubbles discharged from the gas diffuser device to the separation membrane during a long-term operation. In consequence, the suspended substance clogs the pores in the surface of the membrane, so that the filtration flow rate deteriorates, and hence, there is an inconvenience that a maintenance operation is often required to recover the deteriorated filtration flow rate.

For the resolution of this inconvenience, Japanese Patent Application Laid-Open No. 117647/1997 has suggested a method in which the amount of air to be fed to the gas diffuser device is controlled to inhibit the clogging of the gas diffusion pores, but the gas diffusion pores themselves are not considered at all, so that the effect of uniformly washing the membrane module is poor.

Furthermore, as disclosed in Japanese Patent Application Laid-Open No. 192662/1997, there has been suggested a system in which the gas diffuser device alone can easily be removed from a treating tank, but also in this system, the gas diffuser pores themselves are not considered at all, so that the clogging of the gas diffuser pores is allowed and hence there is an inconvenience that a maintenance operation of washing the clogged gas diffuser device is often required.

DISCLOSURE OF THE INVENTION

The present invention has been developed to solve the above-mentioned inconveniences, and an object of the present invention is to provide a water treatment apparatus in which gas discharge holes of a gas diffuser device are scarcely clogged even when filtration is carried out for a long period of time, and as a result, the clogging of the pores in the surface of a membrane with a suspended substance is inhibited and stable filtration is continuously possible for a long time.

That is to say, the first aspect of the present invention is directed to a water treatment apparatus in which a membrane separation device is disposed above a gas diffuser device arranged in a treating tank, wherein diameters of gas discharge holes formed in the gas diffuser device are within a range of 1 to 10 mm, and a relational expression of $20<X/Y<300$ is satisfied wherein X is a sectional area ($cm^2$) of the membrane separation device in a horizontal direction, and Y is the number of the gas discharge holes of the gas-diffuser device.

The second aspect of the present invention is directed to a water treatment method which comprises the step of filtering water to be treated by a membrane separation device while air is continuously or intermittently diffused through a gas diffuser device; diameters of gas discharge holes formed in the gas diffuser device being within a range of 1 to 10 mm; the membrane separation device being disposed above the gas diffuser device in which a relational expression of $20<X/Y<300$ is satisfied wherein X is a sectional area ($cm^2$) of the membrane separation device in a horizontal direction, and Y is the number of the gas discharge holes of the gas diffuser device.

BEST MODE FOR CARRYING OUT THE INVENTION

Figure 1:
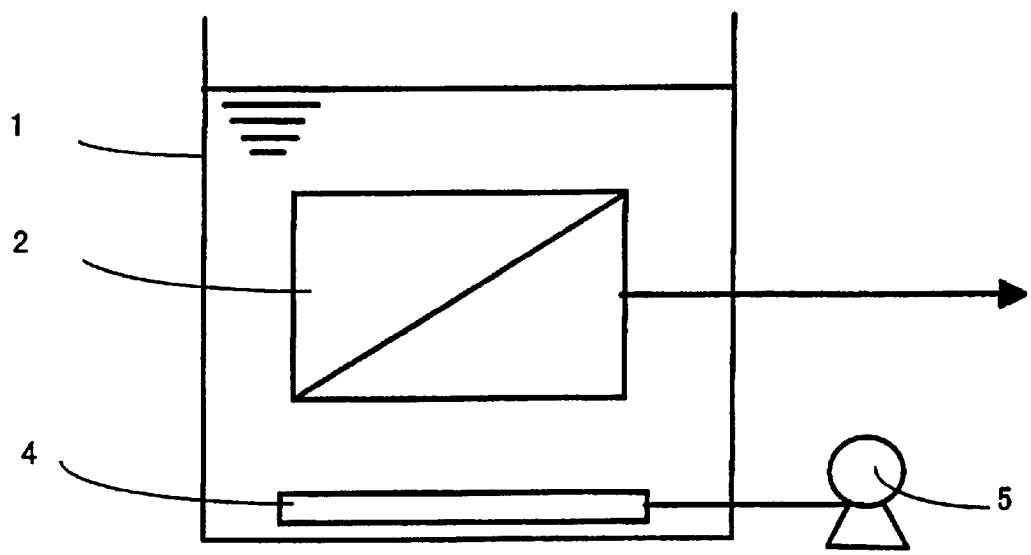
FIG. 1 is a schematic view showing a water treatment apparatus of the present invention.

As shown in FIG. 1, in a water treatment apparatus of the present invention, a water to be treated is aerated in a treating tank 1, whereby the water is subjected to a biological treatment. In the treating tank 1, a membrane separation device 2 is disposed. The top and bottom portions of this membrane separation device is opened, and it has a substantially rectangular solid form. In the membrane separation device, a plurality of membrane modules are arranged usually in a vertical direction.

As the membrane modules for use in the present invention, separation membranes of a plane membrane type, a hollow fiber membrane type, a tubular membrane type, a bag-like membrane type or the like can be used. Moreover, as the material of the separation membranes, there can be used cellulose, polyolefin, polysulfone, PVDF (polyvinylidene fluoride), PTFE (polytetrafluoroethylene), a ceramic material or the like.

Furthermore, the diameter of the pores in each separation membrane for use in the present invention is not particularly limited, and hence it is usually possible to use the so-called ultrafilter membrane having a pore diameter of 0.001 to 0.1 $\mu$m, the so-called precise filter membrane having a pore diameter of 0.1 to 1 $\mu$m, or another membrane having a larger pore diameter. The pore diameter can be selected in compliance with the particle diameter of a substance which is a target of solid-liquid separation. For example, if the separation membranes are used for the solid-liquid separation of an activated sludge, the pore diameter is preferably 0.5 $\mu$m or less, and in the case that sterilization is necessary as in the filtration for water purification, the pore diameter is preferably 0.1 $\mu$m or less.

Under the membrane separation device, a gas diffuser device 4 is disposed. No particular restriction is put on the shape of the gas diffuser device, but it is preferably a gas diffuser pipe in which a tubular pipe made of a metal or a resin is perforated so that air can be fed therethrough from a blower 5, because such a gas diffuser device can easily and inexpensively be manufactured.

Air bubbles which are continuously or intermittently diffused through gas discharge holes of the gas diffuser device reach the membrane separation device passing through the water to be treated, and they are released from the surface of the water passing through the vicinities of the membrane surface of the membrane module. In this case, the air bubbles move upward to the water surface passing through the water to be treated, and hence an upwardly moving gas-liquid mixing flow comprising the water to be treated and the air bubbles is generated. This gas-liquid mixing flow scrubs the membrane surface of the membrane module, whereby the adhesion of the solid content onto the membrane surface can be prevented, thereby inhibiting the rapid clogging of the membrane surface.

In the water treatment device of the present invention, the membrane separation device is provided with the gas discharge holes so that a relational expression of 20<X/Y<300 may be satisfied wherein X is a sectional area (cm$^2$) of the membrane separation device in a horizontal direction, and Y is the number of the gas discharge holes of the gas diffuser device. Such a constitution permits the gas to substantially uniformly discharge through the respective gas discharge holes and also permits the gas bubbles to uniformly apply to the whole membrane module, whereby the closing of the gas discharge holes can be prevented for a long time. Accordingly, the clogging of the pores in the membrane surface can be inhibited for a long time, so that filtration can be carried out at a high flow rate by the membrane separation device.

In the case a X/Y is 20 or less, differences of pressure loss take place between me respective gas discharge holes owing to the presence of burrs formed at the perforation of the gas discharge holes in the gas diffuser device, the fine difference of the shape of the gas discharge holes, the inclination of the gas diffuser device and the like, so Om it is difficult to uniformly generate the gas through all the gas discharge holes. As a result, part of the gas discharge holes of the gas diffuser device are closed, so that the washing effect of the membrane becomes improperly uneven.

On the other hand, in the case that X/Y is 300 or more, the gas discharge holes are easily positioned biasedly to the membrane separation device, so that it is difficult to uniformly feed the gas to the separation membrane. In consequence, portions onto which the gas bubbles are not applied are present, and hence the washing effect of the membrane deteriorates improperly.

Figure 2:
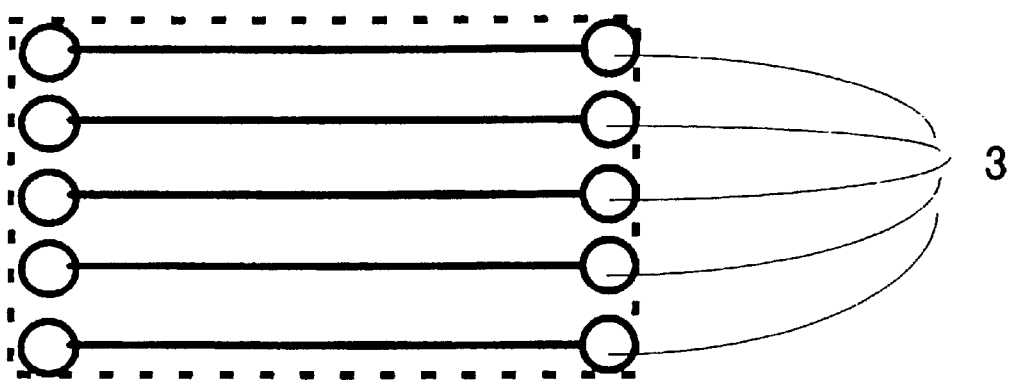
FIG. 2 is one embodiment of a sectional view, in a horizontal direction, of a membrane disposing section of a membrane separation device which is used in the present invention.

It should be noted that in the present invention, the sectional area of the membrane separation device in the horizontal direction means its sectional area in the horizontal direction in a casing, if the casing is present. FIG. 2 shows a schematic sectional view, in the horizontal direction, of a membrane arranging section of the membrane separation device having no casing, and in the case of no casing, the sectional area of the membrane separation device in the horizontal direction referred to in the present invention means a sectional area (a section encircled by a dotted line) of a rectangular parallelepiped having a minimum volume which surrounds all separation membranes (membrane modules 3) arranged.

In the case that a gas diffuser tube is used as the gas diffuser device, it is preferable to use the tube having an inner diameter of 5 to 120 mm, and it is more preferable to use the tube having an inner diameter of 10 to 80 mm. If all the gas diffuser tube is too thin, the discharge of the gas is uneven owing to a pressure loss, and conversely, if it is too thick, its workability is poor, and an interval between the parallelly adjacent gas discharge holes is too large, so that the discharge of the gas becomes easily uneven.

The size of each gas discharge hole is preferably in a range of 1 to 10 mm, more preferably 2 to 5 mm. If the gas discharge holes are too small, it is difficult to secure the predetermined amount of the discharged gas, and the pressure loss also increases. Conversely, if it is too large, a sludge easily gets into the gas diffuser tube, so that the amount of the discharged gas easily becomes uneven between the gas discharge holes.

Furthermore, with regard to a relation between the gas diffuser tube and the size of the gas discharge holes, it is preferred that the internal area of the gas diffuser tube is 1.25 times or more, more preferably 1.67 times or more as much as the total area of the gas discharge holes formed in one gas diffuser tube. If the ratio of the total area of the gas discharge holes to the gas diffuser tube is less than the above value, a pressure balance is easily lost, so that it becomes easily difficult to uniformly discharge air through all the gas discharge holes.

Moreover, as the membrane separation device, there is preferably used a hollow fiber membrane module comprising hollow fiber membranes expanded in a plane like state, fixing members for fixing these hollow fiber membranes while the ends of the hollow fiber membranes are kept open, and structure members for supporting and receiving the fixing members, the hollow fiber membrane module being disposed so that a plane formed by the hollow fiber membranes may be substantially vertical. This constitution is preferable from a viewpoint that the membrane separation device can effectively be washed with the air bubbles and the gas-liquid mixing flow.

Figure 3:
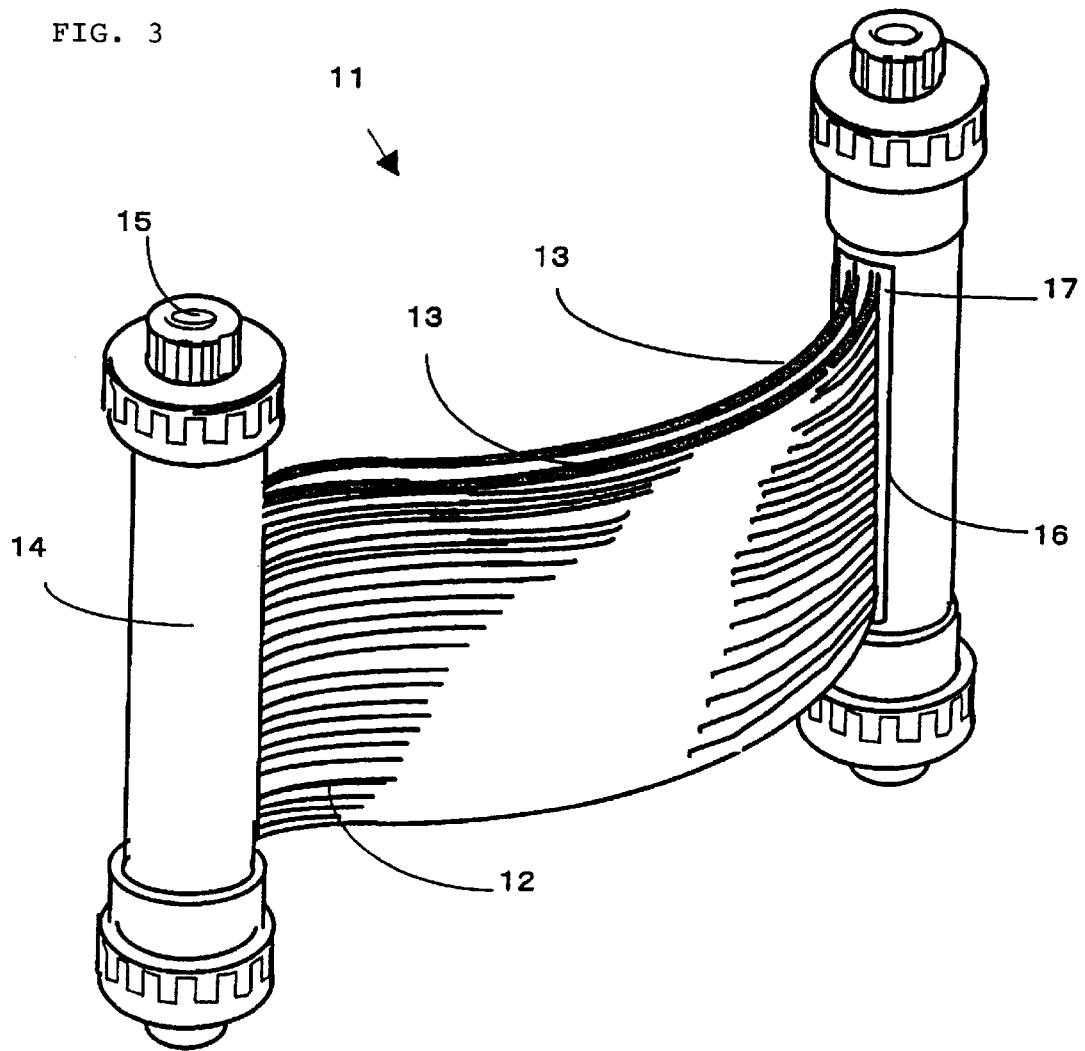
FIG. 3 shows one embodiment of a membrane module for use in the present invention.

FIG. 3 shows one embodiment of a membrane module 3, i.e., a flat type hollow fiber membrane module 11 which can suitably be used in the membrane separation device of the present invention. This flat type hollow fiber membrane module 11 is constituted of a plurality of, usually one to five sheet-like assemblies 13 (in the case of this drawing, two assemblies) comprising a knitted cloth in which a plurality of hollow fiber s 12 are aligned in parallel and they are integrally combined with a warp not shown, and structure members 14 disposed at the opposite ends of the hollow fiber membranes 12 of the sheet-like assemblies 13 in a direction of fiber axes. In the case of such a hollow fiber membrane module, the hollow fiber membranes are scarcely converged in an adhesive and integral state by the sludge or the like, so that the scrubbing can be effectively carried out by the gas diffuser device.

The hollow fiber membrane 12 is made of any of the resins exemplified as the material for the separation membrane of the above flat type membrane module 3, and various kinds of porous and tubular members can be used. The structure member 14 is a cylindrical article in which an internal passage 15 is formed, and its one end is sealed and another end is connected to a water collection tube not shown. In addition, in the side wall of each structure member 14, a slit 16 is formed along the lengthwise direction of the side wall. In each slit 16, the end of the sheet-like assembly 13 is inserted, and these slits are liquid-tightly sealed with fixing members 17, respectively, whereby the opposite ends of each sheet-like assembly 13 are supported and fixed by the two structure members 14, respectively. In this case, the ends of the sheet-like assembly 13 mean the opposite ends of the hollow fiber membrane 12 in the direction of fiber axes, and the opposite ends of the hollow fiber membrane 12 are fixed in the internal passages 15 of the structure members 14, respectively, while the opening state of the hollow fiber membrane is maintained.

No particular restriction is put on the configuration of the hollow fiber membrane module, so long as the plane formed by the hollow fiber membrane is substantially vertical, and for example, there can be taken a configuration in which the fiber axis direction of the hollow fiber membrane is substantially horizontal, a configuration in which the fiber axis direction of the hollow fiber membrane inclines to a horizontal plane, or a configuration in which the fiber axis direction of the hollow fiber membrane is substantially vertical. In consideration of various conditions such as the size, shape, necessary throughput and necessary LV of a treating tank, the suitable configuration should be selected.

Here, when there is taken the configuration in which the fiber axis direction of the hollow fiber membrane is substantially horizontal, the structure members to which the ends of the hollow fiber membrane are fixed are vertically disposed. Such a configuration has an advantage that in the portion through which the air bubbles or the gas-liquid mixing flow is passed, the hollow fiber membrane expanded in the form of a substantially vertical plane is only present, so that membrane density in a filtering section of the hollow fiber membrane module can be heightened, whereby the whole of the membrane separation device can be compacted.

Furthermore, in the case of the configuration in which the fiber axis direction of the hollow fiber membrane inclines to the horizontal plane, the hollow fiber membrane expanded in the form of a substantially vertical plane is only present in the portion through which the air bubbles or the gas-liquid mixing flow is passed, as in the case of the above configuration in which the fiber axis direction of the hollow fiber membrane is substantially horizontal. In consequence, the membrane density in the filtering section of the hollow fiber membrane module can be heightened.

In such a configuration, the hollow fiber membrane can be more compacted in its lengthwise direction but the compaction in its vertical direction is more insufficient, as compared with the above configuration in which the fiber axis direction of the hollow fiber membrane is substantially horizontal. Therefore, in this configuration, the hollow fiber membrane needs to be disposed in a limited length range in the treating tank, but the configuration is suitable for a case where enough space is present in the vertical direction.

Moreover, when there is taken the configuration in which the fiber axis direction of the hollow fiber membrane is substantially vertical, the structure members to which the ends of the hollow fiber membrane are fixed are disposed in parallel. In the case of such a configuration, the structure members are present in the portion through which the air babbles or the gas-liquid mixing flow is passed, so that it is difficult to pass the bubbles or the gas-liquid flow through the membrane and so the washing effect deteriorates, if the adjacent membrane modules are excessively closely disposed Thus, it is required to dispose the modules so that they are separated from each other to some extent, but in this case, the swing of the membranes in the horizontal direction is weaker as compared with the above configuration in which the fiber axis direction of the hollow fiber membrane is substantially horizontal. In consequence, the resistance of the membrane to the passage of the gas and the gas-liquid mixing flow decreases, and hence, as the feed of the gas is increased, a flow velocity of the rising water flow of the gas-liquid mixing flow fairly increases, so that the washing effect can be improved and hence, there is a merit that it is possible to set an LV, i.e., a filtration rate per membrane area, to high levels.

With regard to the membrane density in the membrane arranging section of the membrane separation device for use in the present invention, its lower limit is preferably 100 $m^2/m^3$, more preferably 150 $m^2/m^3$ from the viewpoint of securing a predetermined throughput per volume of the device. Additionally, the upper limit of the membrane density is preferably 500 $m^2/m^3$, more preferably 400 $m^2/m^3$ in consideration of the resistance of the membrane separation device to the passage of the air bubbles and the gas-liquid mixing flow during the washing.

It should be noted that the membrane density in the membrane arranging section referred to in the present invention means a membrane area per volume of a rectangular parallelepiped having a minimum volume surrounding all of the disposed membrane modules.

A filtering operation (solid-liquid separation) by the membrane separation device of the present invention is carried out, for example, as follows. That is to say, a plurality of flat type hollow fiber membrane modules 3 are usually immersed in a water to be treated, and suction is then made through water collection tubes connected to the internal passages 15. At this time, the insides of the hollow fiber membranes 12 become a negative pressure via the internal passages 15, so that the water to be treated which is present outside the modules is filtered through the hollow fiber membranes 12. The resultant filtrate (the treated water) is delivered to the internal passages 15 through the hollow fiber membranes 12, and further collected through the water collection tubes. In the case that the plurality of flat type hollow fiber membrane modules 3 are disposed, the respective water collection tubes are usually all together connected to a suction means such as a pump.

The filtering operation by the membrane separation device of the present invention can also be carried out by the utilization of a water head difference. In the case that the filtration is carried out by the use of the water head difference, electric power of a suction pump or the like is not required, and for this reason, such an operation is preferable from the viewpoint of energy saving. In this case, it is essential that a primary hollow fiber membrane module which is on the inlet side of the water to be treated and a secondary hollow fiber membrane module which is on the outlet side of the water to be treated are disposed so that the water head difference may be provided between the primary hollow fiber membrane module and the secondary hollow fiber membrane module.

Figure 4:
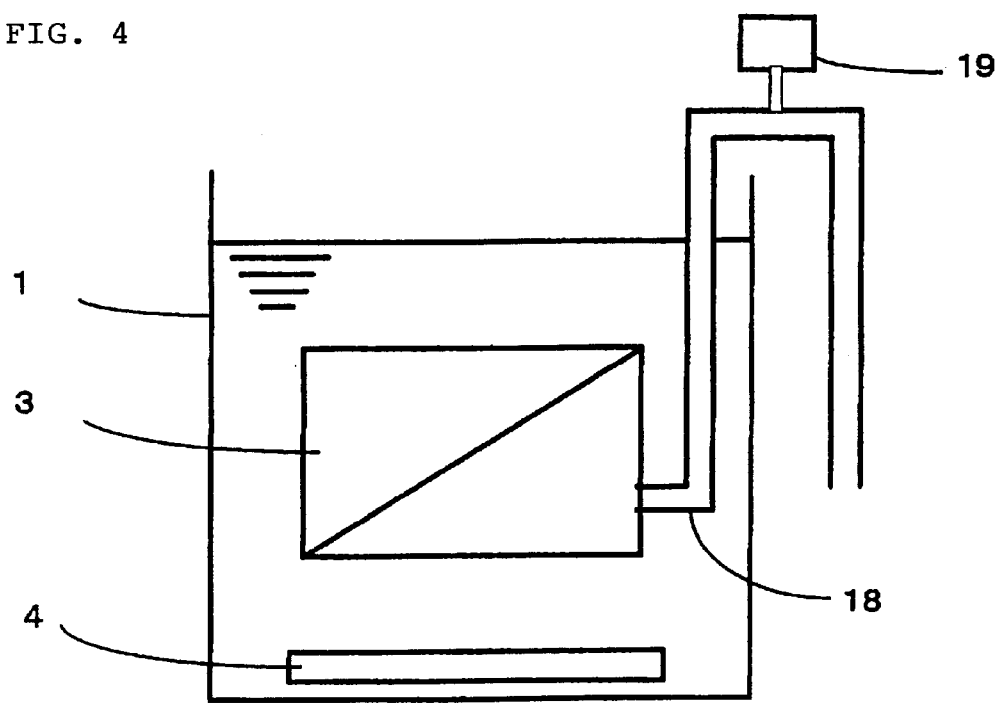
FIGS. 4 to 6 are schematic views showing embodiments in which filtration is carried out by the utilization of a water head difference in the water treatment apparatus of the present invention.

FIG. 4 is a schematic view showing one embodiment in which the filtration is carried out by the utilization of the water head difference in the present invention. In this drawing, a pipe 18 connected to the secondary side of hollow fiber membrane module 3 is formed into a reverse U-tube while the connection between the side and the secondary side of hollow fiber membrane modules 3 is kept in a liquid-tight state, and the outlet of the pipe 18 is released to the atmosphere at the outside the treating tank 1. In addition, the outlet of this pipe 18 (the outlet of the water to be treated) is positioned so as to be lower than the water level of the water to be treated in the treating tank 1 to provide the water head difference between the primary side and the secondary side of hollow fiber membrane modules. In FIG. 4, it is preferable to install deaerating means 19 such as a vacuum pump in the middle of the pipe 18.

Figure 5:
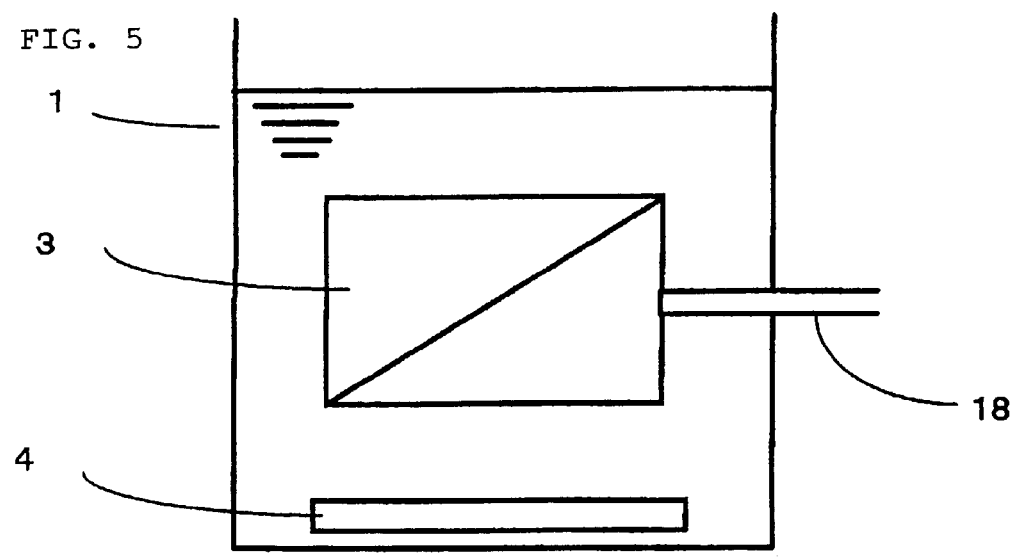

In an embodiment shown in FIG. 5, the pipe 18 connected to the secondary side of hollow fiber membrane module 3 is straightly extended outside the treating tank 1 while the connection between the primary side and the secondary side of hollow fiber membrane modules 3 is kept in the liquid-tight state, and the outlet of the pipe 18 is released to the atmosphere. In addition, the outlet of the pipe 18 is positioned so as to be lower than the water level of the water to be treated in the treating tank 1 to provide the water head difference between the primary side and the secondary side of hollow fiber membrane modules.

Figure 6:
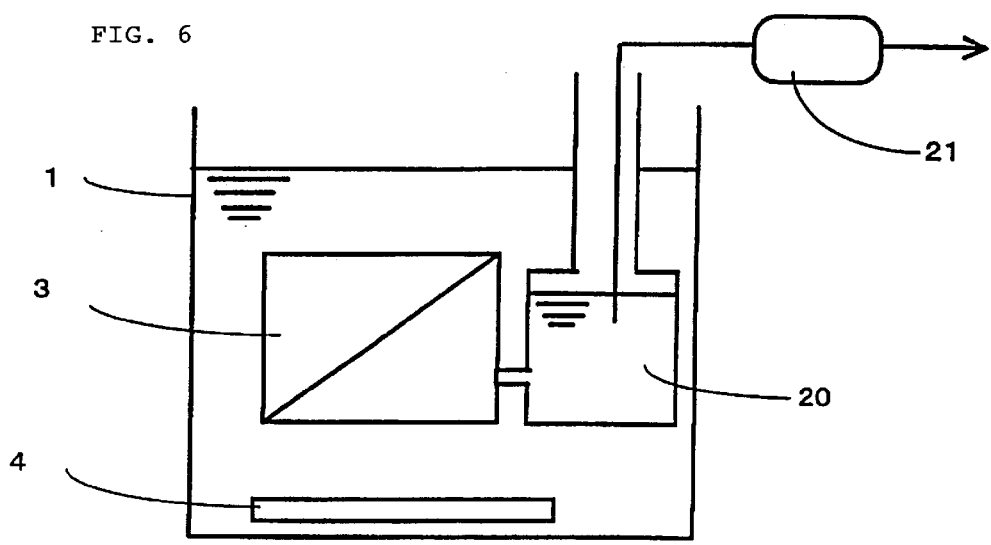

Furthermore, in an embodiment shown in FIG. 6, the secondary side of hollow fiber membrane module 3 is connected to a liquid pool 20 released to the atmosphere in the treating tank 1 via the pipe 18 while the connection between the primary side and the secondary side of hollow fiber membrane modules 3 is kept in the liquid-tight state. In addition, the water level of this liquid pool 20 is positioned so as to be lower than the water level of the water to be treated on the primary side to provide the water head difference between the primary side and the secondary side of hollow fiber membrane modules. The discharge of the filtrate from the liquid pool 20 can be carried out by an optional discharge means 21 such as a submersible pump, a tubular pump, a diaphragm pump, a cascade pump or an air-lift pump.

In the water treatment apparatus of the present invention, in order that the air bubbles discharged through the gas discharge holes of the gas diffuser device and the gas-liquid mixing flow brought about by the air bubbles may reach the membrane separation device at a uniform and sufficient velocity, a certain distance is required between the gas discharge holes and the membrane separation device. The lower limit of the distance of from the gas discharge holes to the membrane separation device is preferably 20 cm, more preferably 30 cm. No particular restriction is put on the upper limit of the above distance, but it is preferably 1 m, more preferably 60 cm in consideration of a volume efficiency of the whole treatment apparatus.

Furthermore, the amount of the gas discharged by the water treatment apparatus of the present invention in a diffusion step is preferably in a range of 10 to 150 Nm$^3$/m$^2$/hr per sectional area of the membrane separation device in the horizontal direction in view of the washing effect of the membrane, and it is more preferably in a range of 20 to 100 Nm$^3$/m$^2$/hr in view of the amount of dissolved oxygen and economy. In addition, with regard to the gas diffusion velocity at the gas discharge holes, the gas is preferably diffused at 5 to 100 cm/sec, more preferably 10 to 50 cm/sec. If the gas diffusion velocity is lower than this range, the sludge is liable to get into the gas diffuser tube, and conversely if it is higher than the above range, the pressure loss increases, and there is a fear that an excessive stress is applied to the separation membrane. Accordingly, such a gas diffusion velocity is not proper.

Next, the present invention will be described in detail in accordance with examples.

EXAMPLE 1

Five hollow fiber membrane modules (trade name Sterapore LF, made by Mitsubishi Rayon Co., Ltd., a module length of the hollow fiber membrane in a fiber axis direction=80 cm, a membrane area=8 m$^2$) in which polyethylene hollow fiber membranes for precise filtration having an average pore diameter of 0.1 $\mu$m were expanded and fixed in a screen state were received in a casing having a length of 80 cm, a width of 30 cm and a height of 50 cm as well as opened top and bottom portions to prepare a membrane separation device, and in this case, the modules were arranged in a transverse direction so that the screens might be arranged in a vertical direction and fiber axes might be aligned in a horizontal direction and a space between the centers of the adjacent modules might be 6 cm. Then, the membrane separation device was immersed in a tank of an activated sludge.

Under the membrane separation device, a gas diffuser device was disposed so that a distance between the lower end of the membrane separation device and gas diffusing holes might be 45 cm, and around the gas diffuser device, a casing having a length of 80 cm, a width of 30 cm and a height of 50 cm as well as opened top and bottom portions was disposed to surround the gas diffuser device. As the gas diffuser device, 5 pipes made of polyvinylchloride having an inner diameter of 2.5 cm (inside sectional area=4.9 cm$^2$) and a length of 35 cm were arranged so that the longitudinal direction of these pipes might make a right angle to the longitudinal direction of the hollow fiber membrane and a distance between the centers of the pipes might be 18 cm. On the top surface of each pipe, 5 circular discharge holes having a diameter of 0.3 cm were formed, and a space between the adjacent discharge holes was 6 cm. Furthermore, each pipe was connected and linked to a pipe made of polyvinylchloride having an inner diameter of 2.5 cm and a length of 85 cm. With regard to the conditions of the air diffusion, air was fed at an intensity of 75 m$^3$/m$^2$/hr per sectional area of the casing by the use of a blower.

With regard to the conditions of the filtration, a filtration treatment of an activated sludge having an MLSS concentration of 8000 to 12000 mg/L was continuously carried out for 1 year at a membrane transmission liquid velocity LV 0.3 m$^3$/m$^2$/d at an intermittent operation of a filtration time/a stop time=13 minutes/2 minutes by the use of a suction pump.

In the case of this example, a sectional area X of the casing in a horizontal direction was 2400 cm$^2$, and a total number Y of the gas discharge holes of the gas lo diffuser device was 25. Therefore, X/Y was 2400/25=96, which met a relational expression specified by the present invention.

Furthermore, a minimum volume surrounding the membrane modules was 0.1044 m³, a total membrane area was 40 m², and a membrane density was 40/0.1044=383.1, which met the preferable range of the present invention.

EXAMPLE 2

Five of the same hollow fiber membrane modules as in Example 1 were received in a casing having a length of 45 cm, a width of 40 cm and a height of 85 cm as well as opened top and bottom portions to prepare a membrane separation device, and in this case, the modules were arranged in a transverse direction so that screens might be arranged in a vertical direction and fiber axes might be aligned in the vertical direction and a space between the centers of the adjacent modules might be 8 cm. Then, the membrane separation device was immersed in a tank of an activated sludge.

Under the membrane separation device, a gas diffuser device was disposed so that a distance between the lower end of the membrane separation device and gas diffusing holes might be 45 cm, and around the gas diffuser device, a casing having a length of 45 cm, a width of 40 cm and a height of 50 cm as well as opened top and bottom portions was disposed to surround the gas diffuser device. As the gas diffuser device, 3 pipes made of polyvinylchloride having an inner diameter of 2.5 cm and a length of 40 cm were arranged so that the longitudinal direction of these pipes might make a right angle to the membrane fixing position of the hollow fiber membrane and a distance between the centers of the pipes might be 20 cm. On the top surface of each pipe, 4 circular discharge holes having a diameter of 0.3 cm were formed, and a space between the adjacent discharge holes was 10 cm. Furthermore, each pipe was connected and linked to a pipe made of polyvinylchloride having an inner diameter of 2.5 cm and a length of 45 cm.

By this water treatment apparatus, a filtration treatment was continuously carried out for 1 year under the same conditions of air diffusion and filtration as in Example 1.

In the case of this example, a sectional area X of the casing in a horizontal direction was 1800 cm², and a total number Y of the gas discharge holes of the gas diffuser device was 12. Therefore, X/Y was 1800/12=150, which met a relational expression specified by the present invention. Furthermore, a minimum volume surrounding the membrane modules was 0.1332 m³, a total membrane area was 40 m², and a membrane density was 40/0.1332=300.3, which met the preferable range of the present invention.

EXAMPLE 3

Three of the same hollow fiber membrane modules as in Example 1 were received in a casing having a length of 80 cm, a width of 30 cm and a height of 50 cm as well as opened top and bottom portions to prepare a membrane separation device, and in this case, the modules were arranged in a transverse direction so that screens might be arranged in a vertical direction and fiber axes might be aligned in a horizontal direction and a space between the centers of the adjacent modules might be 12 cm. Then, the membrane separation device was immersed in a tank of an activated sludge.

Under the membrane separation device, a gas diffuser device was disposed so that a distance between the lower end of the membrane separation device and gas diffusing holes might be 45 cm, and around the gas diffuser device, a casing having a length of 80 cm, a width of 30 cm and a height of 50 cm as well as opened top and bottom portions was disposed to surround the gas diffuser device. As the gas diffuser device, 3 pipes made of polyvinylchloride having an inner diameter of 2.5 cm and a length of 40 cm were arranged so that the longitudinal direction of these pipes might make a right angle to the fiber axis direction of the hollow fiber membrane and a distance between the centers of the pipes might be 35 cm. On the top surface of each pipe, 3 circular discharge holes having a diameter of 0.3 cm were formed, and a space between the adjacent discharge holes was 12 cm. Furthermore, each pipe was connected and linked to a pipe made of polyvinylchloride having an inner diameter of 2.5 cm and a length of 85 cm.

By this water treatment apparatus, a filtration treatment was continuously carried out for 1 year under the same conditions of air diffusion and filtration as in Example 1.

In the case of this example, a sectional area X of the casing in a horizontal direction was 2400 cm², and a total number Y of the gas discharge holes of the gas diffuser device was 9. Therefore, X/Y was 2400/9=266.7, which met a relational expression specified by the present invention. Furthermore, a minimum volume surrounding the membrane modules was 0.1044 m³, a total membrane area was 24 m², and a membrane density was 24/0.1044=229.8, which met the preferable range of the present invention.

EXAMPLE 4

Seven of the same hollow fiber membrane modules as in Example 1 were received in a casing having a length of 80 cm, a width of 40 cm and a height of 50 cm as well as opened top and bottom portions to prepare a membrane separation device, and in this case, the modules were arranged in a transverse direction so that screens might be arranged in a vertical direction and fiber axes might be aligned in a horizontal direction and a space between the centers of the adjacent modules might be 5 cm. Then, the membrane separation device was immersed in a tank of an activated sludge.

Under the membrane separation device, a gas diffuser device was disposed so that a distance between the lower end of the membrane separation device and gas diffusing holes might be 45 cm, and around the gas diffuser device, a casing having a length of 80 cm, a width of 40 cm and a height of 50 cm as well as opened top and bottom portions was disposed to surround the gas diffuser device. As the gas diffuser device, 7 pipes made of polyvinylchloride having an inner diameter of 2.5 cm and a length of 40 cm were arranged so that the longitudinal direction of these pipes might make a right angle to the fiber axis direction of the hollow fiber membrane and a distance between the centers of the pipes might be 12.5 cm. On the top surface of each pipe, 8 circular discharge holes having a diameter of 0.3 cm were formed, and a space between the adjacent discharge holes was 5 cm. Furthermore, each pipe was connected and linked to a pipe made of polyvinylchloride having an inner diameter of 2.5 cm and a length of 85 cm.

By this water treatment apparatus, a filtration treatment was continuously carried out for 1 year under the same conditions of air diffusion and filtration as in Example 1.

In the case of this example, a sectional area X of the casing in a horizontal direction was 3200 cm², and a total number Y of the gas discharge holes of the gas diffuser device was 56. Therefore, X/Y was 3200/56=57.1, which met a relational expression specified by the present invention. Furthermore, a minimum volume surrounding the membrane modules was 0.126 m³, a total membrane area was 56 m², and a membrane density was 56/0.126=444.4, which met the preferable range of the present invention.

COMPARATIVE EXAMPLE 1

A filtration treatment was carried out by the use of the same hollow fiber membrane modules as in Example 1 and the same number and arrangement of the modules as in Example 1 under the following changed conditions. That is to say, under a membrane separation device, a gas diffuser device was disposed so that a distance between the lower end of the membrane separation device and gas diffusing holes might be 45 cm, and around the gas diffuser device, a casing having a length of 80 cm, a width of 30 cm and a height of 50 cm as well as opened top and bottom portions was disposed to surround the gas diffuser device as in Example 1. As the gas diffuser device, 3 pipes made of polyvinylchloride having an inner diameter of 2.5 cm and a length of 35 cm were arranged so that the longitudinal direction of these pipes might make a right angle to the longitudinal direction of the hollow fiber membrane and a distance between the centers of the pipes might be 35 cm. On the top surface of each pipe, 2 circular discharge holes having a diameter of 0.3 cm were formed, and a space between the adjacent discharge holes was 25 cm. Furthermore, each pipe was connected and linked to a pipe made of polyvinylchloride having an inner diameter of 2.5 cm and a length of 85 cm.

By this water treatment apparatus, the filtration treatment was continuously performed for 1 year under the same conditions of air diffusion and filtration as in Example 1.

In the case of this comparative example, a sectional area X of the casing in a horizontal direction was 2400 cm$^2$, and a total number Y of the gas discharge holes of the gas diffuser device was 6. Therefore, X/Y was 2400/6=400, which did not meet a relational expression specified by the present invention. Furthermore, a minimum volume surrounding the membrane modules was 0.1044 m$^3$, a total membrane area was 40 m$^2$, and a membrane density was 40/0.1044=383.1, which met the preferable range of the present invention.

COMPARATIVE EXAMPLE 2

A filtration treatment was carried out by the use of the same hollow fiber membrane modules as in Example 1 under the following changed conditions. That, is to say, under a membrane separation device, a gas diffuser device was disposed so that a distance between the lower end of.the membrane separation device and gas diffusing holes might be 45 cm, and around the gas diffuser device, a casing having a length of 80 cm, a width of 30 cm and a height of 50 cm as well as opened top and bottom portions was disposed to surround the gas diffuser device as in Example 1. As the gas diffuser device, 15 pipes made of polyvinylchloride having an inner diameter of 2.5 cm and a length of 35 cm were arranged so that the longitudinal direction of these pipes might make a right angle to the longitudinal direction of the hollow fiber membrane and a distance between the centers of the pipes might be 5 cm. On the top surface of each pipe, 10 circular discharge holes having a diameter of 0.3 cm were formed, and a space between the adjacent discharge holes was 3.5 cm. Furthermore, each pipe was connected and linked to a pipe made of polyvinylchloride having an inner diameter of 2.5 cm and a length of 85 cm.

By this water treatment apparatus, the filtration treatment was continuously performed for 1 year under the same conditions of air diffusion and filtration as in Example 1.

In the case of this comparative example, a sectional area X of the casing in a horizontal direction was 2400 cm$^2$, and a total number Y of the gas discharge holes of the gas diffuser device was 150. Therefore, X/Y was 2400/150=16, which did not meet a relational expression specified by the present invention. Furthermore, a minimum volume surrounding the membrane modules was 0.1044 m$^3$, a total membrane area was 40 m$^2$, and a membrane density was 40/0.1044=383.1, which met the preferable range of the present invention.

Figure 7:
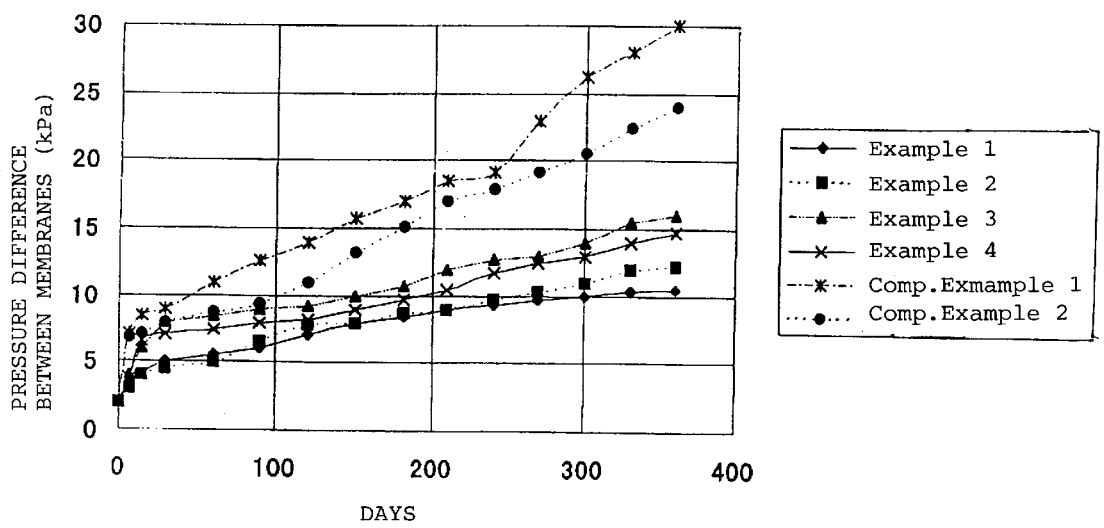
FIG. 7 is a graph showing the behavior of a pressure difference between membranes with time by filtration tests in examples and comparative examples of the present invention.

In each of these examples and comparative examples, there was measured a relation between a time of a filtration operation and a pressure difference between the membranes (a suction pressure difference), i.e., a pressure difference between the primary side of hollow fiber membrane module and the secondary side of hollow fiber membrane module during the suction operation, and the results of the measurement are shown in FIG. 7. As is apparent from the graph in FIG. 7, in the examples regarding the present invention, the rise of the pressure difference between the membranes with time is more moderate than in the comparative examples, and hence it can be understood that the progress of clogging is slow and the efficiency of washing by air scrubbing is high.

According to the water treatment apparatus of the present invention which meets a predetermined relation between the sectional area of the membrane separation device in the horizontal direction and the number of the gas discharge holes of the gas diffuser device, the clogging of the gas discharge holes can be prevented for a long time, and the uniformity of washing by air scrubbing can be maintained. In consequence, the clogging of the pores in the surfaces of the membranes can be inhibited for a long time, so that the filtration of the water to be treated can be carried out at a high flow rate and a high turbidity.

What is claimed is:

1. A water treatment apparatus in which a membrane separation device is disposed above a gas diffuser device arranged in a treating tank, wherein the gas diffuser device comprises a gas diffuser cylindrical pipe, gas discharge holes formed in the gas diffuser pipe have diameters within a range of 1 to 10 mm, an internal sectional area of the gas diffuser pipe is 1.25 times or more as much as the total area of the gas discharge holes formed in the gas diffuser pipe, and a relational expression of 20<X/Y<300 is satisfied wherein X is a sectional area (cm$^2$) of the membrane separation device in a horizontal direction, and Y is the number of the gas discharge holes in the gas diffuser device.

2. The water treatment apparatus according to claim 1, wherein the membrane separation device comprises a hollow fiber membrane module.

3. The water treatment apparatus according to claim 1, wherein the membrane separation device comprises a hollow fiber membrane module including a hollow fiber membrane expanded and arranged in a plane state, fixing members for fixing the hollow fiber membrane while the ends of the hollow fiber membrane are kept open, and the structure members for supporting and receiving the fixing members; and the hollow fiber membrane module being disposed so that the plane formed by the hollow fiber membrane is substantially vertical.

4. The water treatment apparatus according to claim 1, wherein the membrane separation device comprises a hollow fiber membrane module including a hollow fiber membrane expanded and arranged in a plane state, fixing members for fixing the hollow fiber membrane while the ends of the hollow fiber membrane are kept open, and the structure members for supporting and receiving the fixing members; and the hollow fiber membrane module being disposed so that the plane formed by the hollow fiber membrane is substantially vertical and the fiber axis direction of the hollow fiber membrane is substantially horizontal.

5. The water treatment apparatus according to claim 1, wherein the membrane separation device comprises a hollow fiber membrane module including a hollow fiber membrane expanded and arranged in a plane state, fixing members for fixing the hollow fiber membrane while the ends of the hollow fiber membrane are kept open, and the structure members for supporting and receiving the fixing members; and the hollow fiber membrane module being disposed so that the plane formed by the hollow fiber membrane is substantially vertical and the fiber axis direction of the hollow fiber membrane has an angle inclined to a horizontal plane.

6. The water treatment apparatus according to claim 1, wherein the membrane separation device comprises a hollow fiber membrane module including a hollow fiber membrane expanded and arranged in a plane state, fixing members for fixing the hollow fiber membrane while the ends of the hollow fiber membrane are kept open, and the structure members for supporting and receiving the fixing members; and the hollow fiber membrane module being disposed so that the plane formed by the hollow fiber membrane is substantially vertical and the fiber axis direction of the hollow fiber membrane is substantially vertical.

7. The water treatment apparatus according to any one of claims 3, 4, 5 or 6, wherein the hollow fiber membrane module has a primary and a secondary side which are disposed so that a water head difference may be provided between the primary side and the secondary side, and a membrane density in a membrane arranging section is in a range of 100 to 500 $m^2/m^3$.

8. The water treatment apparatus according to any one of claims 3, 4, 5 or 6, wherein the hollow fiber membrane module has a primary and a secondary side, said secondary side is exposed to a liquid pool released to the atmosphere in the treating tank while a connection between the and secondary sides of the hollow fiber membrane module is kept in a liquid-tight state, and the water level of this liquid pool is positioned so as to be lower than the water level of the water to be treated on the primary side.

9. The water treatment apparatus according to claim 1, wherein the membrane separation device comprises a hollow fiber membrane module, and a membrane density in a membrane arranging section is in a range of 100 to 500 $m^2/m^3$.

10. A water treatment method which comprises the step of filtering water to be treated by a membrane separation device while air is continuously or intermittently diffused through a gas diffuser device; the gas diffuser device comprising a gas diffuser cylindrical pipe, gas discharge holes formed in the gas diffuser pipe having diameters within a range of 1 to 10 mm, an internal sectional area of the gas diffuser pipe being 1.25 times or more as much as the total area of the gas discharge holes formed in the gas diffuser pipe, the membrane separation device being disposed above the gas diffuser pipe in which a relational expression of $20<X/Y<300$ is satisfied wherein X is a sectional area ($cm^2$) of the membrane separation device in a horizontal direction, and Y is the number of the gas discharge holes in the gas diffuser device.

11. The water treatment method according to claim 10, wherein said gas diffusion velocity at the gas discharging holes is in a range of 5 to 100 cm/sec.

* * * * *